(12) United States Patent
Ahmad et al.

(10) Patent No.: US 7,149,926 B2
(45) Date of Patent: Dec. 12, 2006

(54) CONFIGURABLE REAL-TIME TRACE PORT FOR EMBEDDED PROCESSORS

(75) Inventors: Sagheer Ahmad, Sunnyvale, CA (US); Robert E. Ober, San Jose, CA (US)

(73) Assignee: Infineon Technologies AG (DE)

( * ) Notice: Subject to any disclaimer, the term of this patent is extended or adjusted under 35 U.S.C. 154(b) by 581 days.

(21) Appl. No.: 10/444,918

(22) Filed: May 22, 2003

(65) Prior Publication Data

US 2004/0250164 A1    Dec. 9, 2004

(51) Int. Cl.
*G06F 11/00* (2006.01)
(52) U.S. Cl. .......................... 714/30; 714/10
(58) Field of Classification Search ................ 714/30, 714/45, 227
See application file for complete search history.

(56) References Cited

U.S. PATENT DOCUMENTS

| 5,764,885 | A | * | 6/1998 | Sites et al. ................ 714/45 |
| 5,944,841 | A | * | 8/1999 | Christie .................... 714/38 |
| 6,145,123 | A | * | 11/2000 | Torrey et al. .............. 717/128 |
| 6,167,536 | A | * | 12/2000 | Mann ........................ 714/45 |
| 6,279,103 | B1 | * | 8/2001 | Warren ...................... 712/227 |
| 6,314,530 | B1 | * | 11/2001 | Mann ........................ 714/38 |
| 6,453,410 | B1 | * | 9/2002 | Satoh ........................ 712/227 |
| 6,615,371 | B1 | * | 9/2003 | McCullough et al. ......... 714/45 |
| 6,665,821 | B1 | * | 12/2003 | Miyayama et al. ............ 714/45 |
| 6,681,321 | B1 | * | 1/2004 | Dale et al. .................. 712/227 |
| 6,684,348 | B1 | * | 1/2004 | Edwards et al. .............. 714/45 |
| 6,732,307 | B1 | * | 5/2004 | Edwards ..................... 714/724 |
| 6,834,365 | B1 | * | 12/2004 | Bardsley et al. ............. 714/45 |
| 6,868,376 | B1 | * | 3/2005 | Swoboda ..................... 703/25 |
| 6,912,675 | B1 | * | 6/2005 | Swoboda ..................... 714/45 |
| 6,918,065 | B1 | * | 7/2005 | Edwards et al. .............. 714/45 |

* cited by examiner

*Primary Examiner*—Robert Beausoliel
*Assistant Examiner*—Amine Riad
(74) *Attorney, Agent, or Firm*—Dickstein, Shapiro, LLP.

(57) ABSTRACT

An embedded processor having a programmable trace port that selectively limits the amount of trace information passed from the processor core to an output buffer, and selectively controls the rate at which the trace information is output from the output buffer to an off-chip debug system. A configurable on-chip filter circuit selectively passes data and program information based on a wide range of user-defined combinations and/or sequences of trigger events (e.g., instruction addresses/types or data addresses/values). The filtered trace information is then compressed using separate data and program compression circuits, and passed to separate data and program output buffer. The data output buffer includes an adjustable read (output) rate (e.g., one-half or one-quarter of the processor core clock cycle), and allows a user to select between one or two output pointers.

21 Claims, 7 Drawing Sheets

CONFIGURABLE REAL-TIME TRACE PORT FOR EMBEDDED PROCESSORS

FIELD OF THE INVENTION

The present invention relates generally to embedded processor devices, and more particularly to a method and structure for debugging programs executed by embedded processors.

BACKGROUND OF THE INVENTION

Integrated circuits, including devices incorporating embedded processors, require substantial testing ("debugging") in order to assure proper functioning. Tracing is an often-used embedded processor debugging technique that involves capturing and analyzing data and/or program ("trace") information generated within the processor core, and then transmitting the trace information through selected pins of the embedded processor device to a test (debug or "emulator") system using a special interface (e.g., a special printed circuit board (PCB) having a socket). Trace operations are generally characterized as either static (post-process) trace operations, or dynamic (real-time) trace operations. Static tracing typically includes writing the trace information into a special on-chip memory while the program is being executed, and then off-loading the trace information after execution is completed. Real-time tracing involves temporarily storing trace information in a relatively small output buffer (e.g., a First-In, First-Out (FIFO) memory structure), and transmitting the trace information from the output buffer through associated device pins to an external debug system (e.g., a computer or workstation running appropriate debug software) while a program is being executed.

Although both real-time and post-process trace operations have beneficial aspects, the main advantage of real-time tracing over post-process tracing is that real-time tracing facilitates smaller device size. Unlike static traces that require a special on-chip memory, real-time trace operations facilitate smaller embedded processor devices because trace data is immediately transmitted off of the embedded processor device while the program is being executed. Further, unlike static tracing where the size of the special on-chip memory limits the amount of trace information that can be generated during a trace operation, the amount of trace information generated during real-time trace operations is theoretically unlimited. With static tracing, the only way to increase the amount of post-process trace information is to increase the special on-chip memory, which further increases chip size.

Despite the advantages of real-time trace operations over static trace operations, practical limitations exist that constrain the use of real-time tracing in some modern embedded processor devices. One such limitation is a possible mismatch between the rate at which trace information is generated by the processor core, and the rate at which the trace information is transmitted from the embedded processor to an external debug system. That is, modern embedded processors have internal clocking speeds of 400 MHz or more, which is often two, four, or more times faster than the transmission/processing speed of an external debug system. When a burst of trace information is too large and generated faster than it can be off-loaded to the external debug system, a buffer "over-run" error occurs in which subsequently generated trace information is unusable.

Two practical solutions to the buffer over-run problem associated with conventional embedded processor devices are to increase the size of the output buffer, and to increase the output rate from the output buffer by off-loading multiple trace information "words" in parallel. However, increasing the size of the output buffer undesirably increases chip size/cost, and only partially addresses the buffer over-run problem in that the output buffer can still be overwhelmed if large amounts of trace data are generated in a relatively short burst. In addition, increasing the output rate from the output buffer requires increasing the number of device pins dedicated to trace operations, which may not be possible in some embedded processor devices. That is, unlike static trace operations in which stored trace information can be transmitted serially, for example, through standard JTAG pins, real-time trace operations typically require a relatively large number of dedicated device pins to transmit trace information to an external debug system at or near the processor core frequency. With the recent trend toward 64-bit (or more) embedded processors having processor core frequencies of 400 MHz or more, a embedded processor designer must make a difficult choice between using device pins for debug operations and "normal operations", and in some cases may not have sufficient pins to transmit real-time trace information. Although compression techniques such as those associated with IEEE-ISTO 5001™-1999 (the "Nexus 5001 Forum™ Standard") have been used to reduce the demand for dedicated pins by reducing the amount of off-loaded trace information, these conventional compression techniques provide insufficient control over trace operations in many embedded processor applications, thereby leading to buffer over-runs that produce unusable trace information.

What is needed is a configurable trace port for embedded processors that avoids the buffer over-run problems associated with conventional real-time trace circuits. What is also needed is a configurable trace port that supports a wide range of embedded processor devices and debug systems.

SUMMARY OF THE INVENTION

The present invention is directed to a configurable trace port (circuit) for an embedded processor device that selectively limits the amount of trace information passed from a processor core to an external debug system by allowing a user to selectively filter data and program information based on a wide range of user-defined combinations and/or sequences of trigger events (e.g., instruction addresses/types or data addresses/values), and then compressing the filtered data/program information, thereby alleviating the data trace over-runs associated with conventional processors. The present invention is also directed to a configurable trace port that allows selective control over the trace information output rate to an off-chip debug system, thereby providing a trace port that supports a wide range of embedded processor devices and debug systems.

According to an embodiment of the present invention, an embedded processor device includes a configurable trace port that is connected between a processor core and a set of dedicated device pins. The configurable trace port includes a configurable filter circuit that passes trace information from data and/or program busses located in the processor core. The trace information is then compressed by a compression circuit, and then written into a configurable output buffer (e.g., a FIFO). The buffered trace information is then written from the configurable output buffer to an external debug system via a set of dedicated device pins and a test socket.

According to an aspect of the present invention, the configurable filter circuit of the trace port monitors processor core operations, and passes selected data/program values to the compression circuit in response to user-defined combinations and/or sequences of instruction and/or data addresses/values utilized in the processor core. In particular, trace operations are enabled and disabled using a plurality of user-configurable trigger event detection registers that generate pre-trigger signals in response to user-defined trigger events (e.g., the execution of an instruction located within a user-defined range of instructions), and a programmable trigger logic circuit that generates intermediate (combinational) trigger signals in response to user-defined combinations of the pre-trigger signals, and/or generates an intermediate (sequential) trigger signal in response to a user-defined sequences of either the pre-trigger signals or the combinational trigger signals. The intermediate trigger signals are then utilized to assert trace enable/disable control signals that control the flow of trace information into the trace port. Accordingly, the configurable trace port of the present invention facilitates highly flexible trace operations during the development of a software program that allows a developer to selectively limit the amount of trace information passed to the compression circuit and output buffer of the trace port.

According to another aspect of the present invention, the compression circuit utilized to compress the filtered program trace information and data trace information includes a program compression circuit and data compression circuit. The program compression circuit receives program information (e.g., program counter values and associated instruction identification information), and generates one or more bytes (8-bits) of compressed program information along with corresponding identification codes that identify each byte of compressed program information. The data compression circuit receives both data address and data value information, and generates one or more words (e.g., 32-bits) of compressed data information and corresponding identification codes. By compressing both program and data information prior to transmission to the output buffer, the present invention further facilitates highly flexible trace operations during the development of a software program by further limiting the amount of trace information passed to the output buffer of the trace port.

According to yet another aspect of the present invention, the configurable output buffer includes a program FIFO circuit and a data FIFO circuit that separately buffer compressed program trace and data trace information, and drive the buffered data values onto corresponding dedicated device pins at a selected frequency (e.g., f/2 or f/4, where f is the core frequency) in order to facilitate a wide range of embedded processor applications and associated debug systems. Each of the program FIFO circuit and the data FIFO circuit includes a write pointer circuit, a series of FIFO registers, and a read pointer/driver circuit. The write pointer circuits of the program/data FIFO circuits write program/data trace information into the respective program/data FIFO registers at the processor core clock speed. According to another aspect of the present invention, the read pointer/driver circuit of the data FIFO circuit is configurable to utilize one or more output pointers to allow high frequency off-loading when sufficient device pins are available, thereby supporting both Class 3 and Class 4 compliant Nexus 5001 Forum trace operations.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Figure 1:
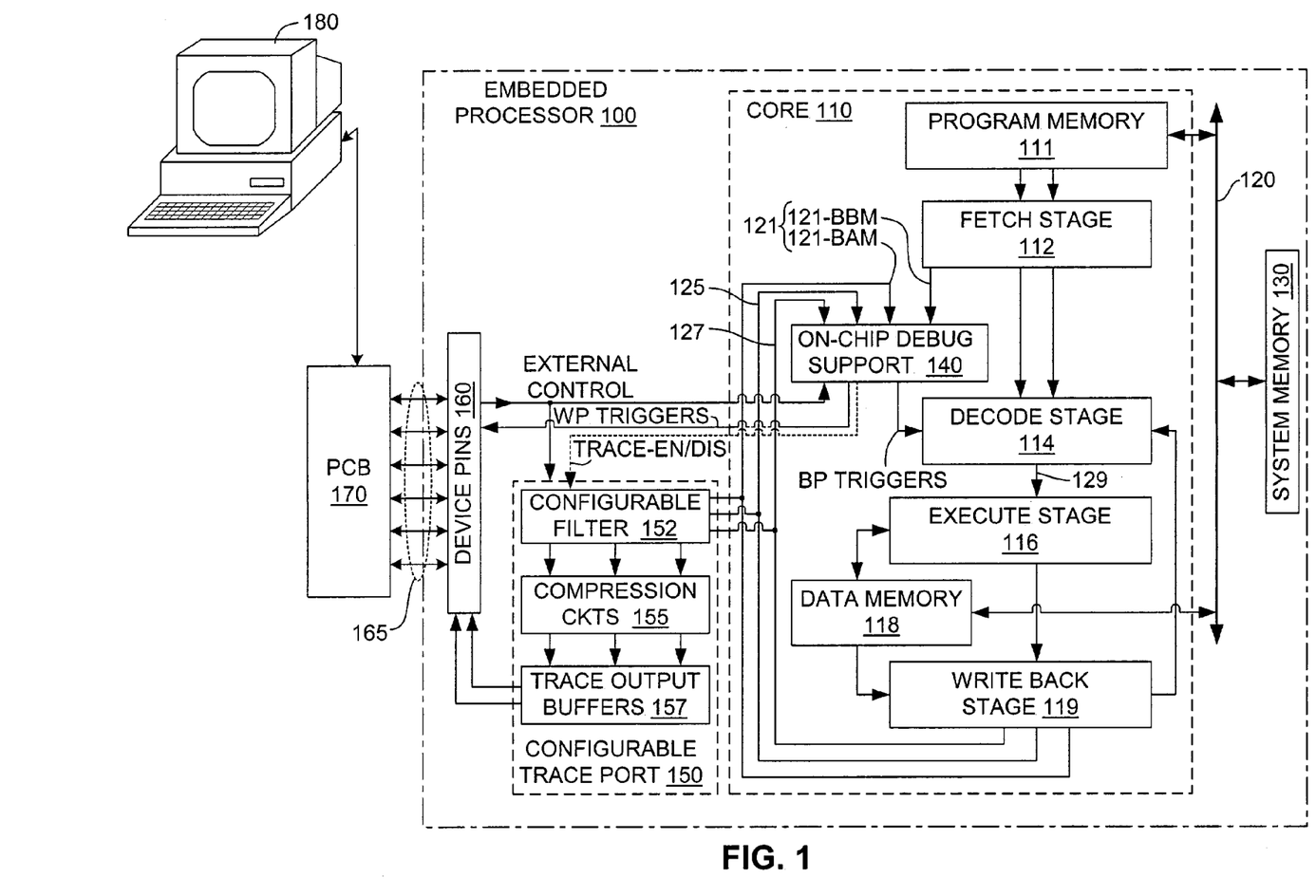
FIG. 1 is simplified block diagram showing a system for testing an embedded processor including a configurable test port according to an embodiment of the present invention.

FIG. 1 is a block diagram is a simplified diagram showing a test arrangement for testing/debugging an embedded processor device 100. Device 100 is fabricated using known techniques onto a substrate (die) that is then packaged according to known techniques such that electrical connection is provided to the various circuits making up device 100 through a plurality of pins 160. During the test process, device 100 is typically mounted onto a printed circuit board (PCB) 170 such that signal paths are provided between pins 160 and a debug system (e.g., a computer or workstation running suitable debugging software) 180.

Referring to the right side of FIG. 1, embedded processor device 100 includes a processor core 110 that communicates via a bus 120 with on-board system memory 130. Core 110 includes a program memory 111 for storing instructions associated with a developer's software program, a fetch stage 112 for fetching (retrieving) instructions to be executed, a decode stage 114 for decoding the fetched instructions, an execute stage 116 for executing the instructions is an appropriate order, a data memory 118 for temporarily storing data acted upon by execute stage 116, and a write back stage 119 for writing data and instructions back to preceding sections of core 110 and to the on-board memory components. Instructions and data are transmitted within core 110 using portions of bus 120 referred to below as an instruction bus 121, a data address bus 125, and a data value bus 127. In particular, program bus 121 transmits instruction address information (e.g., a program counter value that identifies the "position" of the instruction within a program) and information regarding the instruction type (e.g., load, store, loop, etc.). Data value bus 127 transmits a data value "loaded" (read) from a particular processor register, or a data value "stored" (written) into a particular register, and information regarding the size of the data value (e.g., the number of bytes read or written). Data address bus 125 transmits the source or destination address of the register to/from which the data value on data value bus 127 is loaded/stored. Those of ordinary skill in the art will recognize that the data and program information loaded/stored as described herein may be obtained from distinct and separate bus portions within processor core 110. Further, the operation of core 110 is generally known in the art and is beyond the scope of the present invention; therefore, a detailed description of core 110 is omitted for brevity.

Embedded processor device 100 also includes an on-chip debug support (OCDS) circuit 140, which in the present embodiment is located in core 110 and is connected to instruction bus 121, data address bus 125, and data value bus 127. The purpose of the OCDS circuit 140 is to generate breakpoint (BP) trigger signals (indicated as being directed to decode stage 114) and watchpoint (WP) trigger signals (which are directed outside of core 110) in response to user-defined trigger events occurring within core 110, and also in response to external trigger events generated outside of core 110. In one embodiment, the user-defined trigger events occurring within core 110 are detected by monitoring data and program information transmitted on instruction bus 121, data address bus 125, and data value bus 127. Of particular relevance to the present invention is the generation of one or more trace enable/trace disable (TRACE-EN/DIS) control signals by OCDS circuit 140 that are utilized to control configurable trace port 150 (discussed below). Novel aspects of OCDS 140 that are related to the generation of the trace enable/disable control signals are described in additional detail below. Additional detail regarding OCDS circuit 140 is disclosed in co-owned and co-pending U.S. patent application Ser. No. 10/317,875-6764, now U.S. Pat. No. 7,010,672, entitled "Digital Processor With Programmable Breakpoint/Watchpoint Trigger Generation Circuit", which is incorporated herein by reference in its entirety.

According to an embodiment of the present invention, configurable trace port 150 is connected between processor core 110 and a set of dedicated device pins 160. In particular, configurable trace port 150 receives data and program (instruction) information that are generated in core 110 and transmitted on, for example, instruction bus 121, data address bus 125, and data value bus 127. Configurable trace port includes a configurable filter circuit 152, a compression circuit 155, and a configurable output buffer (e.g., a FIFO) 157. According to the methods described in additional detail below, configurable filter circuit 152 is utilized to alleviate data trace over-runs by selectively limiting the amount of trace information passed from processor core 110 to external debug system 180 by allowing a user to selectively filter data and program information based on a wide range of user-defined combinations and/or sequences of trigger events (e.g., instruction addresses/types or data addresses/values). Note that the phrase "trace information" is utilized herein to refer only to data/program information passed by configurable filter circuit 152 to compression circuit 155. Compression circuit 155 then compresses the filtered trace information in the manner described below, and then the compressed trace information is written into configurable output buffer (e.g., a FIFO) 157. The buffered trace information is then written from the configurable output buffer to external debug system 180 via associated (dedicated) device pins 160 and a test socket 170. According to the methods described in additional detail below, configurable output buffer 157 allows selective control over the trace information output rate to external debug system 180, thereby enabling configurable trace port 150 to support a wide range of embedded processor devices and debug systems.

Figure 2:
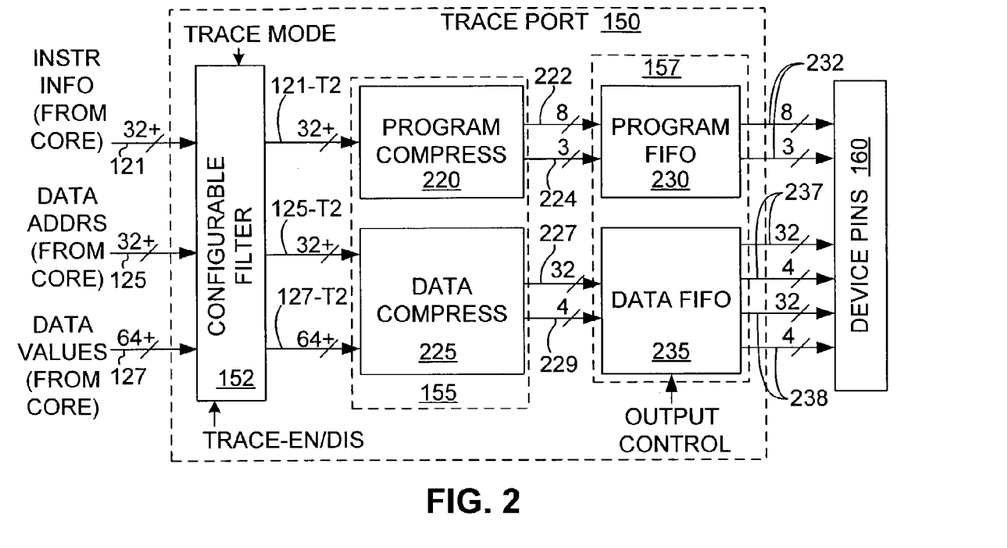
FIG. 2 is block diagram showing the configurable trace port circuit utilizing by the embedded processor of FIG. 1 in additional detail.
Figure 3:
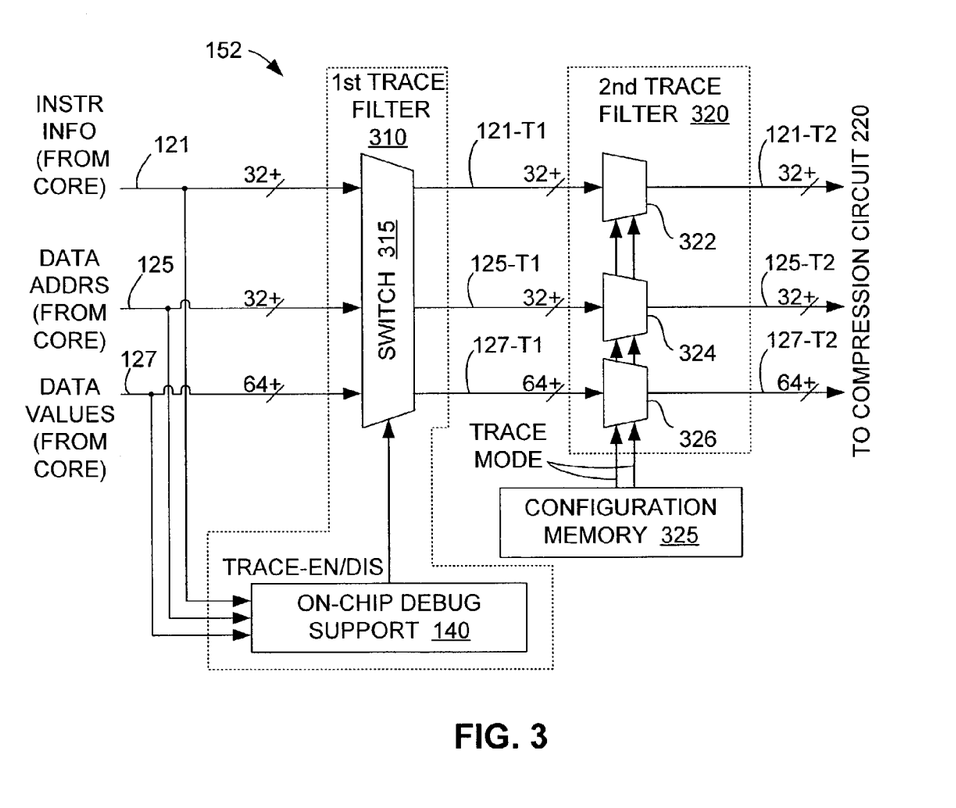
FIG. 3 is a simplified block diagram showing a filter circuit utilized by the trace port circuit of FIG. 2 according to an embodiment of the present invention.

FIG. 2 is a simplified block diagram showing configurable filter circuit 152, compression circuit 155, and configurable output buffer 157 of configurable trace port 150 according to an exemplary embodiment of the present invention. As mentioned above, configurable filter circuit 152 receives program (instruction) information from instruction bus 121, data address bus 125, and data value bus 127, and passes selected trace information to compression circuit 155. In the exemplary embodiment, configurable filter circuit 152 is controlled both the TRACE-EN/DIS control signal received from OCDS circuit 140, and by a TRACE MODE control signal generated, for example, by user-programmable configuration memory (described below). Also in accordance with the exemplary embodiment, compression circuit 155 is separated into a first (program) compression circuit 220 and a second (data) compression circuit 225, and output buffer 157 is separated into a program (first) FIFO 230 and a data (second) FIFO 235. Program compression circuit 220 receives 32 bits of program (instruction) trace information from configurable filter 152 (along with one or more identification bits), and generates compressed program trace information that is passed to program FIFO 230 of output buffer 157. Data compression circuit 225 receives 32 bits of data address information and 64 bits of data value information from configurable filter 152 (along with one or more data identification bits), and generates compressed data trace information that is passed to data FIFO 235 of output buffer 157. Each of the circuit portions associated with the exemplary embodiment shown in FIG. 2 is described in additional detail below.

Configurable Filter Circuit

FIG. 3 is a simplified block diagram showing configurable filter circuit 152 in additional detail. According to an embodiment of the present invention, configurable filter circuit 152 includes a first trace filter 310 that is controlled by the TRACE-EN/DIS control signal received from OCDS circuit 140, and a second trace filter 320 that is controlled by one or more TRACE MODE control signals generated by a configuration memory 325.

Referring to the left side of FIG. 3, first trace filter 310 monitors processor core 110 (i.e., is connected to core buses 121, 125, and 127), and includes a switch 315 that is controlled by the TRACE-EN/DIS control signal to pass selected trace information "words" on intermediate bus lines 121-T1, 125-T1, and 127-T1 to second trace filter circuit 320. For example, switch 315 is enabled (opened, or turned on) to pass data and program information from busses 121, 125, and 127 when the TRACE-EN/DIS control signal is asserted, and is disabled (closed, or turned off) to prevent the passage of program and data information when the TRACE-EN/DIS control signal is de-asserted. As discussed in greater detail below, the TRACE-EN/DIS control signal is asserted and de-asserted according to user-defined combinations and/or sequences of instruction and/or data addresses/values transmitted on busses 121, 125, and 127.

Referring briefly to FIG. 1, OCDS circuit 140 receives first instruction signals from fetch stage 112 via a first instruction bus portion 121-BBM, and second instruction signals from write back stage 119 via a second instruction bus portion 121-BAM. OCDS circuit 140 also receives data address signals from write back stage 119 via a portion of data address bus 125, and data value signals from write back stage 119 via a portion of data value bus 127. As mentioned above, OCDS circuit 140 is utilized to generate TRACE-EN/DIS control signals that are used to control switch 315 of configurable filter circuit 152. In the embodiment shown in FIG. 1, OCDS circuit 140 is incorporated into core 110, although in other embodiments portions of OCDS circuit 140 may be replicated in configurable filter circuit 152, as suggested in FIG. 3. In the embodiment shown in FIG. 3, OCDS circuit 140 receives 32-bit instruction signals (plus one or more instruction identification bits) from fetch stage 112 and write back stage 119 (see FIG. 1) via a first instruction bus portion 121. OCDS circuit 340 also receives 32-bit data address signals (plus one or more data address identification bits) from write back stage 119 via a data address bus 125, and 64-bit data value signals (plus one or more data value identification bits) from write back stage 119 via data value bus 127. Although the purpose of the OCDS circuit 140 is to generate several breakpoint and watchpoint signals in response to user-defined trigger events occurring within core 110, of particular relevance to the present invention are the user-defined trigger events that are used to generate one or more TRACE-EN/DIS control signals.

Figure 4:
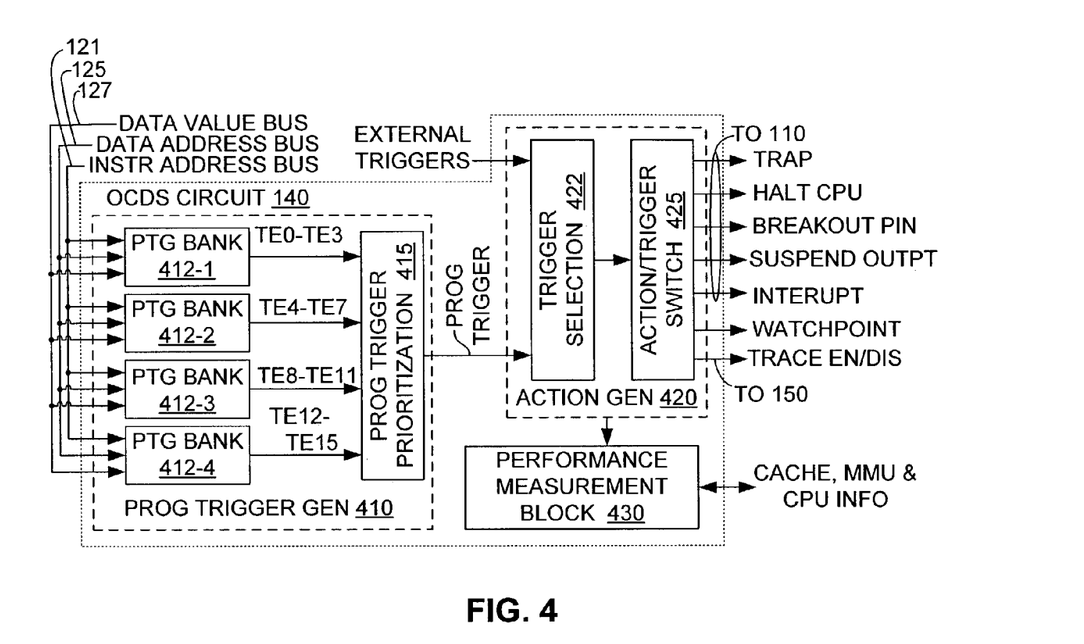
FIG. 4 is a block diagram showing an on-chip debug support (OCDS) circuit for generating trace enable/disable control signals utilized by the filter circuit of FIG. 3.

FIG. 4 is a simplified block diagram showing OCDS circuit 140 in additional detail according to an embodiment of the present invention. OCDS circuit 140 includes a programmable trigger generator (PROG TRIGGER GEN) circuit 410, an action generator (ACTION GEN) circuit 420, and a performance measurement block 430. Programmable trigger generator 410 and action generator 420 are discussed in detail below. Performance measurement block 430 includes counters that can be used for multiple purposes, such as measuring the time taken by core 110 (FIG. 1) to complete a given task, caching performance analysis information associated with for a given application, measuring MMU performance, and verifying architectural features. Because the operation of performance measurement block 430 is peripheral to the operation of trigger generator 410 and action generator circuit 420, a detailed description of measurement block 430 is omitted for brevity.

Referring to the left side of FIG. 4, programmable trigger generator 410 includes one or more programmable trigger generator (PTG) banks 412-1 through 412-4, and an optional programmable trigger prioritization circuit 415. Programmable trigger generator (PTG) banks 412-1 through 412-4 generate several trigger signals TS0 through TS15 in response to user-defined combinations or sequences of instruction addresses/types and/or data addresses/values processed transmitted on instruction bus 121, data address bus 125, and data value bus 127, respectively (note that instruction bus 121 includes instruction addresses passed on both instruction bus portion 121-BBM from fetch stage 112 and instruction bus portion 121-BAM from write back stage 119; see FIG. 1). Because two or more of multiple trigger signals TS0–TS15 can be generated simultaneously, a programmable trigger prioritization circuit 415 is provided to select an output programmable trigger (PROG TRIGGER) signal from such simultaneously asserted multiple trigger signals TS0–TS15 according to predetermined hard-wired priority (although a user-programmable priority circuit may be used). As discussed in additional detail below, the output programmable trigger signal transmitted to action generator 420 includes an action identification that defines the action to be taken in response to the associated trigger signal TS0–TS15.

Action generator circuit 420 includes a trigger selection (e.g., multiplexing) circuit 422 and an action/trigger switch circuit 425. Trigger selection circuit 422 passes either one of the external triggers or the programmable trigger (received from trigger generator 410) to action/trigger switch 425 according to a predetermined priority. Each trigger passed to action/trigger switch 425 includes an action identification (ID) that corresponds to an associated breakpoint trigger or watchpoint trigger, and also includes source identification data and signals that specify whether the action is associated with a BBM or BAM action. Action/trigger switch 425 decodes the action ID associated with each trigger received from trigger selection circuit 422, and asserts TRACE-EN/DIS control signals that are transmitted to switch 315 (see FIG. 3) or another associated watchpoint trigger, or an associated breakpoint trigger (e.g., TRAP or HALT) that is transmitted either to core 110 (FIG. 1). For example, when a programmable trigger generated by programmable trigger generator 410 is passed by trigger selection circuit 422 having an action ID corresponding to a "trace enable" trigger action, then action/trigger switch 425 asserts the TRACE-EN/DIS control signal, which is transmitted to switch 315, thereby causing switch 315 to pass a corresponding trace information "word" (i.e., 32+ bits from instruction bus 121, 32+ bits from data address bus 125, and 64+ bits from data value bus 127) to compression circuit 155. The trace operation is subsequently turned off (disabled) when an associated programmable trigger is asserted, which causes action/trigger switch 425 to de-assert the TRACE-EN/DIS control signal, thereby causing switch 315 to block (i.e., prevent) the passage of information from busses 121, 125, and 127 to compression circuit 155.

Figure 5:
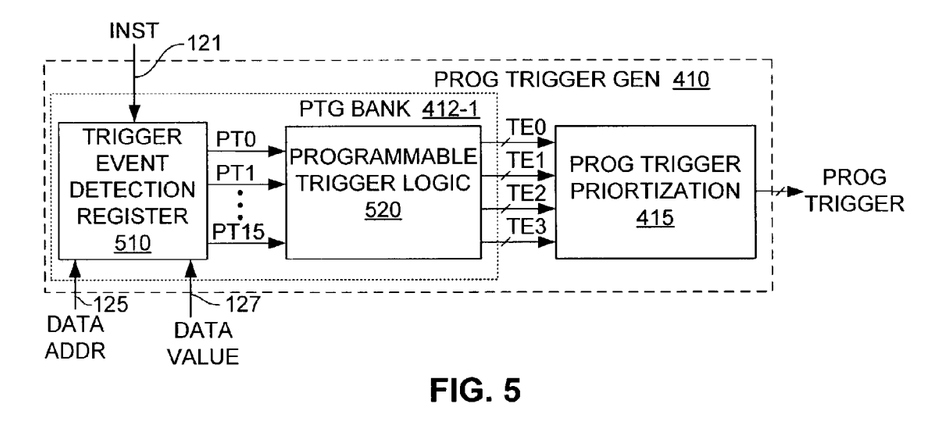
FIG. 5 is a block diagram showing programmable trigger generator utilized by the OCDS circuit according to an embodiment of the present invention.

FIG. 5 is a block diagram showing a portion of programmable trigger generator 410 in additional detail. In particular, FIG. 5 shows the main circuit blocks associated with PTG bank 412-1, which is representative of PTG banks 412-2 through 412-4 (see FIG. 4). In accordance with an embodiment of the present invention, PTG bank 412-1 includes a trigger event detection (TED) register 510 and a programmable trigger logic circuit 520. Similar to conventional breakpoint/watchpoint trigger circuits, TED register 510 monitors instruction, data address, and data value signals transmitted on instruction bus 121, data address bus 125, and data value bus 127, respectively, and generates pre-trigger signals PT0 through PT15 when user-defined instructions/addresses/values are transmitted on these busses. In particular, TED register 510 is programmed by a developer to store predetermined instruction, data address, and data value information. During debug operations, the stored instructions/addresses/values are compared with instructions, data addresses, and data values transmitted on busses 121, 125, and 127, respectively. When the transmitted addresses/values match (or are within a range defined by) the stored addresses/values, an associated pre-trigger signal is generated that is passed to programmable trigger logic circuit 520. Programmable trigger logic circuit 520 is also programmed by the developer to selectively detect logical combinations of pre-trigger signals and/or sequences thereof, and to generate associated triggers TE0 through TE3 when the user-defined logical combinations and/or sequences occur. Triggers TE0 through TE3 are then passed to programmable trigger prioritization circuit 415 (discussed above), which passes one of these triggers (or a trigger from another PTG bank) to action generator 420 (see FIG. 4).

Figure 6:
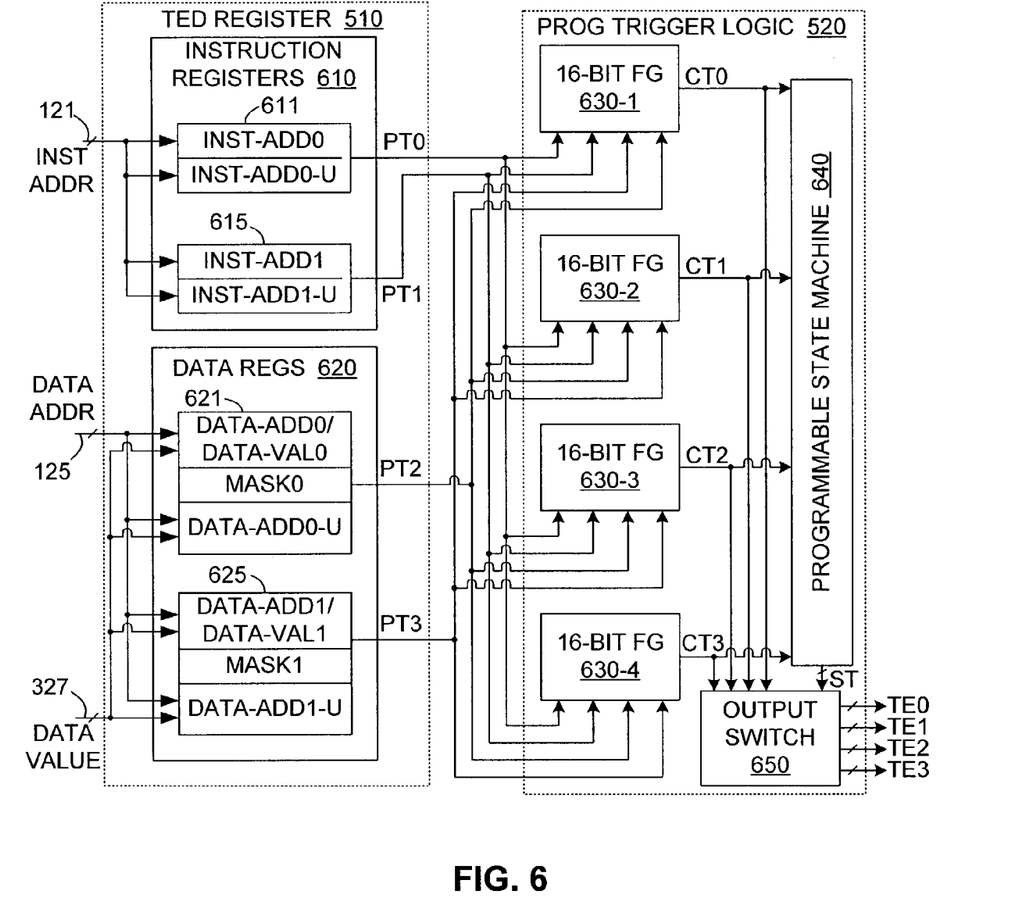
FIG. 6 is a simplified circuit diagram showing a portion of the programmable trigger generator of FIG. 5.

FIG. 6 is a block diagram showing TED register 510 and programmable trigger logic circuit 520 of PTG bank 412-1 according to a specific embodiment of the present invention.

Referring to the left side of FIG. 6, TED register 510 includes instruction register circuit 610 that monitors instruction address (INST ADDR) information transmitted on instruction bus 121, and data register circuit 620 that monitors data addresses transmitted on data address (DATA ADDR) bus 125 and data values transmitted on data value bus 127. Note that in dual pipeline processors, an additional instruction address bus associated with instructions passed from the fetch stage, as well as from the write back stage, to the decode stage on the second pipeline may also be monitored by instruction registers 610 using known techniques.

Instruction register circuit 610 includes a first register 611 for storing a first instruction address INST-ADD0 and an optional upper range instruction address INST-ADD0-U. In a single-address operating mode, first register 611 asserts a pre-trigger signal PT0 when an address transmitted on instruction bus 121 matches instruction address INST-ADD0 (in this mode upper range address INST-ADD0-U is empty or disabled). Alternatively, in a multiple-address operating mode, first register 611 asserts pre-trigger signal PT0 when an address transmitted on instruction bus 121 falls within a range defined by instruction addresses INST-ADD0 and INST-ADD0-U. Similarly, instruction register circuit 610 includes a second register 615 for storing a second instruction address INST-ADD1 and an optional upper range instruction address INST-ADD1-U, and generates a pre-trigger signal PT1 when an address transmitted on instruction address bus 121 matches instruction address INST-ADD1 (or falls within the range defined by INST-ADD1 and INST-ADD1-U).

Similar to instruction register circuit 610, data register circuit 620 includes a first register 621 for storing a first data address DATA-ADD0 and a first upper range address DATA-ADD0-U, and a second register 625 for storing a second data address DATA-ADD1 and a second upper range address DATA-ADD1-U. In addition, first register 621 also stores a first data value DATA-VAL0 and an optional first mask value MASK0, and second register 625 also stores a second data value DATA-VAL1 and an optional second mask value MASK1. Mask values MASK0 and MASK1 facilitate masking a portion or all of data values DATA-VAL0 and DATA-VAL1, thereby causing data register circuit 620 to operate in essentially the same manner as instruction register 610 (described above). In particular, first register 621 generates a pre-trigger signal PT2 when a data address transmitted on data address bus 125 matches data address DATA-ADD0 (or falls within the range defined by DATA-ADD0 and DATA-ADD0-U), and second register 625 generates a pre-trigger signal PT3 when a data address transmitted on data address bus 125 matches data address DATA-ADD1 (or falls within the range defined by DATA-ADD1 and DATA-ADD1-U). Some or all of the data values DATA-VAL0 and DATA-VAL1 can also be included in these comparison processes by associated use of mask values MASK0 and MASK1. For example, first register 621 can be programmed to match a particular data address transmitted on data address bus 125 and four bits of a data value transmitted on data value bus 127 by storing the desired data address as DATA-ADD0, storing the four bits in DATA-VAL0, and setting mask value MASK0 to mask all but these four bits.

Referring to the right side of FIG. 6, the four pre-trigger signals PT0 through PT3 generated by TED register 510 are transmitted to four 16-bit function generators (FGs) 630-1 through 630-3 of programmable trigger logic circuit 520. 16-bit FGs 630-1 through 630-4 are programmable combinational logic circuits that generate intermediate (combinational) triggers CT0 through CT3 according to programmed functions of pre-triggers PT0 through PT3. In other words, combinational triggers CT0 through CT3 can be expressed as:

$CT0=f0(PT0,PT1,PT2,PT3);$ $CT1=f1(PT0,PT1,PT2,PT3);$ $CT2=f2(PT0,PT1,PT2,PT3);$ and $CT3=f3(PT0,PT1,PT2,PT3),$ where f0, f1, f2, and f3 are any logical function of PT0, PT1, PT2 and PT3. Combinational triggers CT0 through CT3 that are either passed to a programmable state machine 640, or selectively converted by output switch circuit 650 to generate triggers TE0 through TE3. As discussed in additional detail below, programmable state machine 640 is programmed to generate a sequential trigger signal ST when a programmed sequence of combinational triggers is satisfied. When programmable state machine 640 is utilized, output switch circuit 650 generates an associated trigger (e.g., TE0) in response to sequential trigger signal ST (in this case, three unused triggers, e.g., TE1 through TE3, are disabled or otherwise unused).

Figure 7:
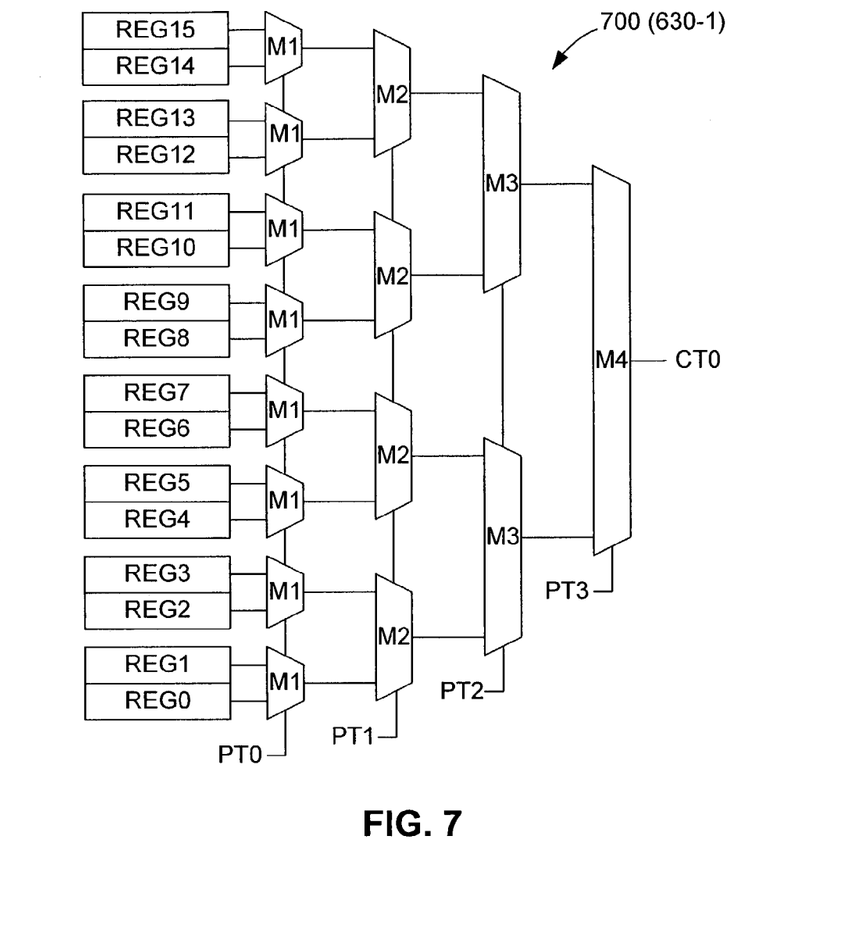
FIG. 7 is a simplified circuit diagram showing a sum-of-products circuit utilized in the programmable trigger generator of FIG. 5.

FIG. 7 is a simplified diagram depicting a 16-bit sum-of-products circuit 700 that serves as 16-bit FG 630-1 according to a specific embodiment of the present invention. In particular, SOP circuit 700 includes sixteen registers REG0 through REG15 that store an associated bit (i.e., 0 or 1). Each register is coupled to input terminals of a first set of two-input MUXs, each designated M1, that are controlled by pre-trigger PT3. The output terminals of MUXs M1 are connected to input terminals of a second set of two-input MUXs, each designated M2, that are controlled by pre-trigger PT2. Similarly, the output terminals of MUXs M2 are connected to input terminals of two-input MUXs M3, which are controlled by pre-trigger PT1, and the output terminals of MUXs M3 are connected to input terminals of two-input MUX M4, which is controlled by pre-trigger PT0. By storing appropriate values in registers REG0 through REG 15, 16-bit SOP circuit 700 is capable of implementing any logical function of pre-trigger signals PT0 through PT3. For example, to define CT0=(PT0 or PT1) and (PT2 or PT3), then CT0 would be TRUE (i.e. binary value 1) in all the cases set forth in Table 1 (below):

TABLE 1

| PT3 | PT2 | PT1 | PT0 | REG. |
|-----|-----|-----|-----|------|
| 0 | 1 | 0 | 1 | 5 |
| 0 | 1 | 1 | 0 | 6 |
| 0 | 1 | 1 | 1 | 7 |
| 1 | 0 | 0 | 1 | 9 |
| 1 | 0 | 1 | 0 | 10 |
| 1 | 0 | 1 | 1 | 11 |
| 1 | 1 | 0 | 1 | 13 |
| 1 | 1 | 1 | 0 | 14 |
| 1 | 1 | 1 | 1 | 15 |

To assert combinational trigger signal CT0 under the conditions set forth in Table 1, a logic 1 is stored in each register REG5 through REG 7, REG 9 through REG11, and REG13 through REG15. One of these logic 1 values is, in effect, passed from its associated register through the series of MUXes shown in FIG. 7 when any of the combinations of pre-triggers shown in Table 1 is satisfied. Those of ordinary skill in the art will recognize that sum-of-products circuits other than the specific arrangement shown in FIG. 7 can be used to provide a similar programmable function, so SOP circuit 700 is therefore not intended to be limiting.

Referring briefly to FIG. 6, each of the combinational trigger signals CT0 through CT1 is applied to output switch 650, and also to programmable state machine 640.

Figure 8:
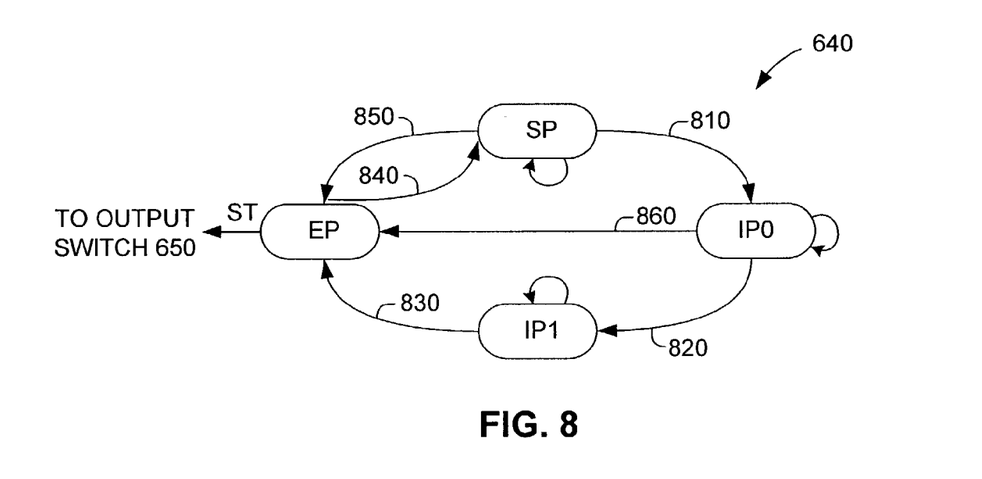
FIG. 8 is a finite state machine diagram depicting a state machine utilized in the programmable trigger generator of FIG. 5 according to an embodiment of the present invention.

FIG. 8 is a finite state machine diagram representation depicting programmable state machine 640 according to an embodiment of the present invention. State machine 640 includes four states: start point SP, first intermediate point IP0, second intermediate point IP1, and end point EP. Of course, state machine 640 can be implemented with any arbitrary number of states. Each state is assigned a two-bit code (i.e., having a value of zero to three) that identifies one of the four combinational trigger signals CT0 through CT3, and passes control to an associated next sequential state when the combinational trigger signal identified by the stored two-bit code is asserted. For example, assuming start point SP stores the two-bit code "00", control is retained by start point SP until combinational trigger signal CT0 is asserted, at which point control is passed on path 810 from start point SP to first intermediate point IP0. Subsequently, control is retained by first intermediate point IP0 until a combinational trigger signal matching the two-bit code associated with first intermediate point IP0 is asserted, at which point control is passed on path 820 from second intermediate point IP0 to second intermediate point IP1. Next, control is retained by second intermediate point IP1 until a combinational trigger signal matching the two-bit code associated with second intermediate point IP1 is asserted, at which point control is passed on path 830 from second intermediate point IP1 to end point EP. Finally, after control is passed to end point EP, control is retained until a combinational trigger signal matching the two-bit code associated with end point EP is asserted, at which point sequential trigger signal ST is asserted (i.e., passed to output switch 650; see FIG. 6), and control is returned on path 840 to start point EP.

If fewer than four states are desired, then end point EP is loaded with the same two-bit code as the last state of the dependency. For example, to generate sequential trigger signal ST in response to a single state sequence (e.g., when combinational trigger signal CT2 is asserted), then the two-bit codes for SP, IP0, IP1, and EP should be loaded with the digital values 2, 2, 2, and 2, respectively. This setting results in the direct passage of control from start point SP to end point EP along path 850 when combinational trigger signal CT2 is asserted. Similarly, to generate sequential trigger signal ST in response to the sequence of CT2 followed by CT1, the two-bit codes for SP, IP0, IP1, and EP should be loaded with the digital values 2, 1, 1, and 1, respectively. This setting results in the passage of control from start point SP to first intermediate point IP0 when combinational trigger signal CT2 is asserted, and then the passage of control from intermediate point IP0 directly to end point EP along path 860 when combinational trigger signal CT1 is subsequently asserted. Finally, to generate sequential trigger signal ST in response to the sequence of CT2 followed by CT1 and CT1 followed CT3 (i.e., CT2→CT1→CT3), the two-bit codes for SP, IP0, IP1, and EP should be loaded with the digital values 2, 1, 3, and 3, respectively.

Referring again to FIG. 6, output switch 650 is user-programmed to generate a predetermined set of trigger signals in response to corresponding combinational trigger signals CT0 through CT3 or in response to sequential trigger signal ST. For example, output switch 650 may be programmed to generate trigger TE0 in response to combinational trigger signal CT0, with trigger TE0 including an action ID associated with a "CPU halt" breakpoint trigger operation. Alternatively, output switch 650 may be programmed to generate trigger TE0 in response to sequential trigger signal ST, with trigger TE0 including an action ID associated with an "enable data trace" watchpoint trigger operation. The thus-generated triggers are then passed to action generator 420 (see FIG. 4) in the manner described above.

Referring back to FIG. 3, the TRACE-EN/DIS control signal generated by OCDS circuit 140 selectively opens and closes switch 315, thereby allowing a developer to selectively control the number of trace information words passed to second trace filter 320 based on a wide range of trigger events, both combinational and sequential. Accordingly, the present invention facilitates the development of a software program by allowing the user to limit the amount of trace information passed to output buffer 157 (FIG. 1), thereby avoiding the buffer over-run problems associated with conventional trace control circuits.

Referring to the right side of FIG. 3, second trace filter 320 includes separate switch circuits 322, 324, and 326 that are controlled by one or more TRACE MODE control signals to pass/block selected portions of trace information transmitted on intermediate buses 121-T1, 125-T1 and 127-T1. According to another aspect of the present invention, second trace filter 320 facilitates further control over trace operations by allowing the user/developer to selectively block portions of the trace operation words passed by switch 315, thereby further limiting the amount of data passing through output buffer 157 (FIG. 1). For example, one or more TRACE MODE control signals may be set to pass only program trace information (i.e., to prevent the passage of data address and data value information from being passed to output busses 125-T2 and 127-T2, respectively), or to pass only data trace information (i.e., to prevent the passage of program trace information from being passed to output bus 121-T2). Further, program and data trace information may be passed/blocked based on the type of instruction executed, as determined by the identification information provided with each program trace word. For example, TRACE MODE control signals may be set to trace only store instruction operations. Accordingly, second trace filter 320 can be used to further limit the amount of data passed to compression circuit 155 (see FIGS. 1 and 2).

Compression Circuit

Referring again to FIG. 2, compression circuit 155 receives the filtered trace information passed by configurable filter circuit 152 on filter output busses 121-T2, 125-T2, and 127-T2, compresses the filtered trace information, and then passes the compressed trace information to output buffer 157. In particular, program compression circuit 220 receives up to 32+ bits of program (instruction) trace information from switch circuit 322 (see FIG. 3) at core frequency, and generates one or more compressed program trace bytes on a program address bus 222, and one or more corresponding 3-bit identification codes on a program address identification bus 224. The compressed program trace bytes and 3-bit program identification codes are simultaneously written into program FIFO 230 at the core frequency. According to another aspect of the present invention, program compression circuit 220 and data compression circuit 225 further facilitate highly flexible trace operations during the development of a software program by further limiting the amount of trace information passed to the output buffer of the trace port using the compression techniques described below.

Figure 9:
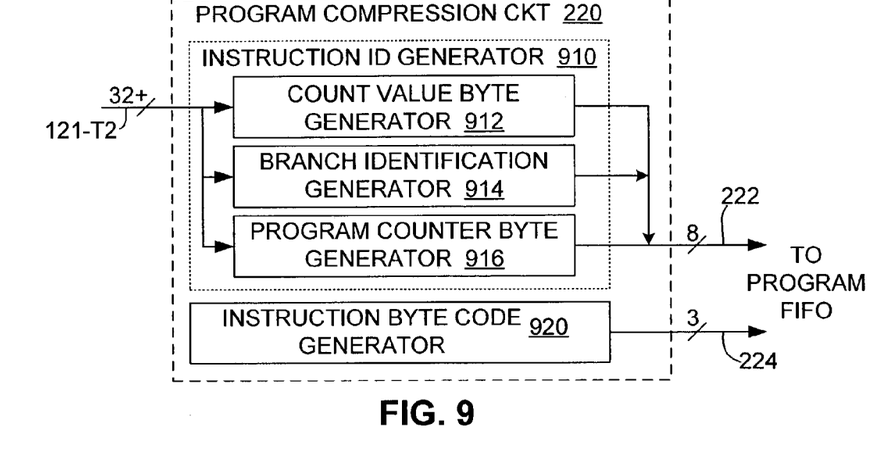
FIG. 9 is a simplified diagram showing a compression circuit utilized by the trace port circuit of FIG. 2.

FIG. 9 is a simplified block diagram showing program compression circuit 220 in additional detail according to a specific embodiment of the present invention. In general, program compression circuit 220 includes instruction identification generator 910 for generating the 8-bit compressed program trace bytes transmitted on program address bus 222, and an instruction byte code generator 920 for generating the corresponding 3-bit identification codes transmitted on program address identification bus 224.

Referring to the upper portion FIG. 9, instruction identification generator 910 can be functionally represented by a count value byte generator 912, a branch identification generator 914, and a program counter byte generator 916. Count value byte generator 912 calculates the number of instructions executed by core 110 (FIG. 1) between a currently traced instruction and a previously traced instruction, and generates an 8-bit binary count value indicating the difference. Branch identification generator 914 generates an 8-bit message when an indirect branch has been executed and taken. Program counter byte generator 916 transmits the 32-bit program counter address associated with the currently executed instruction in three sequential bytes (least significant byte first).

Referring to the bottom of FIG. 9, instruction byte code generator 920 generates 3-bit codes identifying each byte transmitted from instruction identification generator 910. In one embodiment, an additional one-bit signal is utilized to identify multi-threaded activity (i.e., in multi-threaded processors). Table 2 (below) lists exemplary program identification (PID) codes and a description of the associated program trace byte transmitted with each PID code.

TABLE 2

| PID | ID CODE DESCRIPTION | PROGRAM TRACE BYTE |
|---|---|---|
| 000 | DEFAULT STATE | UNSPECIFIED |
| 001 | MULTI-BYTE TRACE | PROGRAM TRACE MESSAGE |
| 010 | PROG TRACE DIRECT BRANCH | 8-BIT INSTR COUNT VALUE |
| 011 | PROG TRACE INDIRECT BRANCH | 8-BIT INSTR COUNT VALUE + UNIQUE PROG COUNTER VALUE |
| 100 | PROG COUNTER SYNCH CODE | 32-BIT PROG CNTR VALUE |
| 101 | NOT USED | NONE |
| 110 | TRACE LOST | NONE |
| 111 | NOT USED | NONE |

Figure 10A:
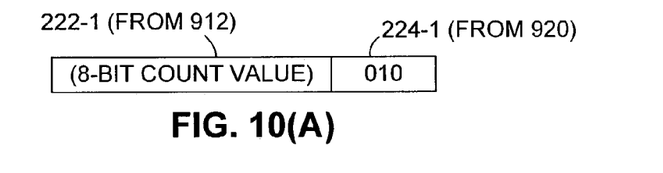
FIGS. 10(A), 10(B), and 10(C) are a simplified diagram showing data generated by the compression circuit of FIG. 9.
Figure 10B:
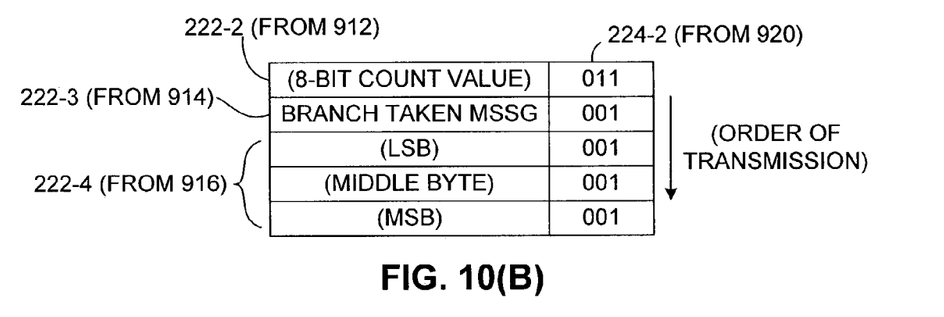
Figure 10C:
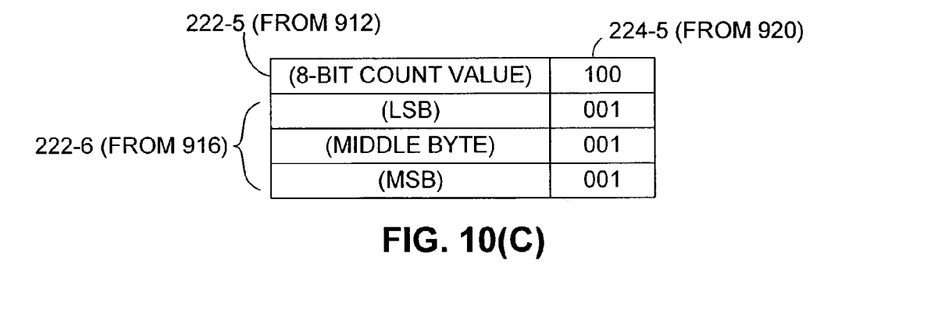

FIGS. 10(A) through 10(C) are diagrams depicting exemplary transmissions from program address bus 222 and program address identification bus 224.

FIG. 10(A) depicts a direct branch program trace transmission, which is generated each time a discontinuity in the program flow occurs. The direct branch program trace includes an 8-bit count value 222-1 indicating the number of instructions executed since the last generated trace was calculated. The direct branch taken is not calculated in the instructions executed, in compliance with the NEXUS 5001 Forum standard. The 8-bit count value, together with a PID value 224-1 equal to '010', are respectively transmitted on busses 222 and 224.

FIG. 10(B) depicts an indirect branch program trace transmission, which is generated when an indirect (calculated) branch instruction is executed. Similar to the direct branch transmission, the indirect branch transmission includes a calculation value 222-2 including the number of instructions executed since the last traced instruction. In one embodiment, a branch taken message 222-3 providing information about the indirect branch taken is included. In addition, the jumped-to instruction address 222-4 is generated using up to three bytes. In one embodiment, the jumped-to instruction address only includes the unique portion of the current program counter value with respect to that of the previously traced instruction, which is calculated in a manner consistent with the NEXUS 5001 Forum standard. If the MSB (Most Significant Byte) is different, then the entire 32-bit PC is signaled using three bytes, as indicated in FIG. 10(B). Referring to the right side of FIG. 10(B), the PID value 224-2 equal to '011' is transmitted with the 8-bit count value 222-2, and the PID value '001' is transmitted with each subsequent bit of the indirect branch program trace transmission.

FIG. 10(C) depicts a program synchronization transmission, which is generated when the processor begins executing from reset, and is also generated when the instruction count exceeds 248. Similar to other transmissions, the program synchronization transmission includes a calculation value 222-5 including the number of instructions executed since the last traced instruction (which is zero at reset), along with the instruction address 222-6 (typically three bytes). Referring to the right side of FIG. 10(B), the PID value 224-4 equal to '100' is transmitted with the 8-bit count value 222-2, and the PID value '001' is transmitted with each subsequent bit of the indirect branch program trace transmission.

Referring again to Table 2 (above), as described in additional detail below, the trace lost program identification code (110) is generated when an output buffer over-run occurs, and signals a loss of trace continuity.

According to another aspect of the present invention, the program compression performed by program compression circuit 220 and the storage and issuance of program trace information from program FIFO 230 are completely independent from the compression, storage and issuance of data trace information by data compression circuit 225 and data FIFO 235. Data trace operations typically have more stringent bandwidth requirements than program trace operations. Therefore, decoupling the program and data compression and buffering facilitates trace operations because data trace can be filtered separately based on the data trace requirement of the application.

Referring again to FIG. 2, data compression circuit 225 receives up to 32+ bits of data address trace information and up to 64+ bits of data value information from switch circuits 324 and 326 (see FIG. 3) at core frequency, respectively, and generates one or more 32-bit compressed data trace words on a data bus 227, and one or more corresponding 4-bit identification codes on a data identification bus 229. In particular, the data address and data value information is combined into as few 32-bit compressed data trace words as possible. The compressed data trace words and 4-bit data information codes are simultaneously written into data FIFO 235 (FIG. 2) at core frequency. By compressing the filtered trace information in this manner, the present invention further enhances the ability of configurable trace port 150 to avoid buffer over-runs by further minimizing the amount of trace information passed to output buffer 157.

Table 3 (below) lists various data word descriptions and associated 4-bit data information codes generated by data compression circuit 225 according to an embodiment of the present invention. Similar to the program address identification codes (discussed above), a specific data identification code is transmitted with the first 32-bit data word in each transmission, and subsequent data words (if any) are transmitted with the data information code '0001'.

TABLE 3

| DID | ID CODE DESCRIPTION | DATA WORD |
| --- | --- | --- |
| 0000 | DEFAULT STATE | UNSPECIFIED |
| 0001 | MULTI-WORD TRACE | DATA TRACE MESSAGE |
| 0010 | UNIQUE LOAD ADDR BYTE ACCESS | 24-BITS UNIQUE ADDR AND 8-BITS DATA VALUE |
| 0011 | FULL LOAD ADDR BYTE ACCESS | 32-BITS UNIQUE ADDR AND 8-BITS DATA VALUE |
| 0100 | UNIQUE LOAD ADDR HALF WORD ACCESS | 16-BITS UNIQUE ADDR AND 16-BITS DATA VALUE |
| 0101 | FULL LOAD ADDR HALF WORD ACCESS | 32-BITS UNIQUE ADDR AND 16-BITS DATA VALUE |
| 0110 | FULL LOAD ADDR WORD ACCESS | 32-BITS UNIQUE ADDR AND 32-BITS DATA VALUE |
| 0111 | FULL LOAD ADDR DOUBLE WORD ACCESS | 32-BITS UNIQUE ADDR AND 64-BITS DATA VALUE |
| 1000 | TRACE LOST | NONE |
| 1001 | ADDRESS ONLY MODE | 32-BIT ADDRESS |
| 1010 | UNIQUE STORE ADDR BYTE ACCESS | 24-BITS UNIQUE ADDR AND 8-BITS DATA VALUE |
| 1011 | FULL STORE ADDR BYTE ACCESS | 32-BITS UNIQUE ADDR AND 8-BITS DATA VALUE |
| 1100 | UNIQUE STORE ADDR HALF WORD ACCESS | 16-BITS UNIQUE ADDR AND 16-BITS DATA VALUE |
| 1101 | FULL STORE ADDR HALF WORD ACCESS | 32-BITS UNIQUE ADDR AND 16-BITS DATA VALUE |
| 1110 | FULL STORE ADDR WORD ACCESS | 32-BITS UNIQUE ADDR AND 32-BITS DATA VALUE |
| 1111 | FULL STORE ADDR DOUBLE WORD ACCESS | 32-BITS UNIQUE ADDR AND 64-BITS DATA VALUE |

According to the embodiment disclosed in Table 3, data compression circuit 225 compresses both data address and data value information into a single 32-bit data trace word when the total number of bits needed to represent the unique data address and data value information is equal to or less than 32. For example, a "Unique L/S Addr Byte Access" data word is generated (along with a data word ID code value '0010' or '1010') when the data value stored/loaded is one byte, and the associated register address can be represented by a 24-bit unique address value representing a difference between the previous load/store address data trace and the current load/store data trace. Similarly, a "Unique L/S Addr Byte Access" data word is generated (along with a data word ID code value '0100' or '1100') when the data value stored/loaded is two bytes, and the associated register address can be represented by a 16-bit unique address value. Note that data compression circuit 225 compresses both data address and data value information into two 32-bit data trace words when the total number of bits needed to represent the unique data address and data value information is between 32 and 64 (e.g., "Full L/S Addr Byte Access", codes 0011, 1011; "Full L/S Addr Half Word Access", codes 0101, 1101; and "Full L/S Addr Word Access", codes 0110, 1110). Note also that the only case in which data compression is not available is "Full L/S Addr Double Word Access" (codes 0111, 1111). Accordingly, in most cases, data compression circuit 225 significantly reduces the amount of trace data information passed to output buffer 155 (FIG. 1), thereby facilitating trace operations that reduce the chance of the buffer over-run problem associated with conventional trace circuits.

Configurable Output Buffer

Referring back to the right side of FIG. 2, according to yet another aspect of the present invention, configurable output buffer 157 includes a program FIFO circuit 230 and a data FIFO circuit 235 that separately buffer compressed program trace and data trace information received from program compression circuit 220 and data compression circuit 225, respectively, and drive the buffered program and/or data values onto corresponding dedicated device pins 160 at frequency determined by one or more output control signals provided from configurable memory (not shown). In particular, program FIFO circuit 230 receives, at the processor core frequency, the one or more compressed program bytes and associated identification codes transmitted on program address bus 222 and program address identification bus 224, respectively, temporarily buffers (stores) this program trace information, and then transmits (drives) the program trace information on a buffer output bus 232 to a corresponding set of device pins 160 at a frequency set by the one or more output control signals (e.g., f/2 or f/4, where f is the core frequency). Similarly, data FIFO circuit 235 receives, at the processor core frequency, the one or more compressed data words and associated identification codes transmitted on data trace bus 227 and data trace identification bus 227, respectively, temporarily buffers this data trace information, and then transmits the data trace information on a buffer output bus 237 to a corresponding set of device pins 160 at the frequency set by the output control signals. Note that, according to another aspect discussed further below, an optional second output bus 238 is selectively enabled using the output control signals to transmit a second data trace word (and associated code) each write cycle to an additional set of device pins 160.

Figures 11, 12A, 12B:
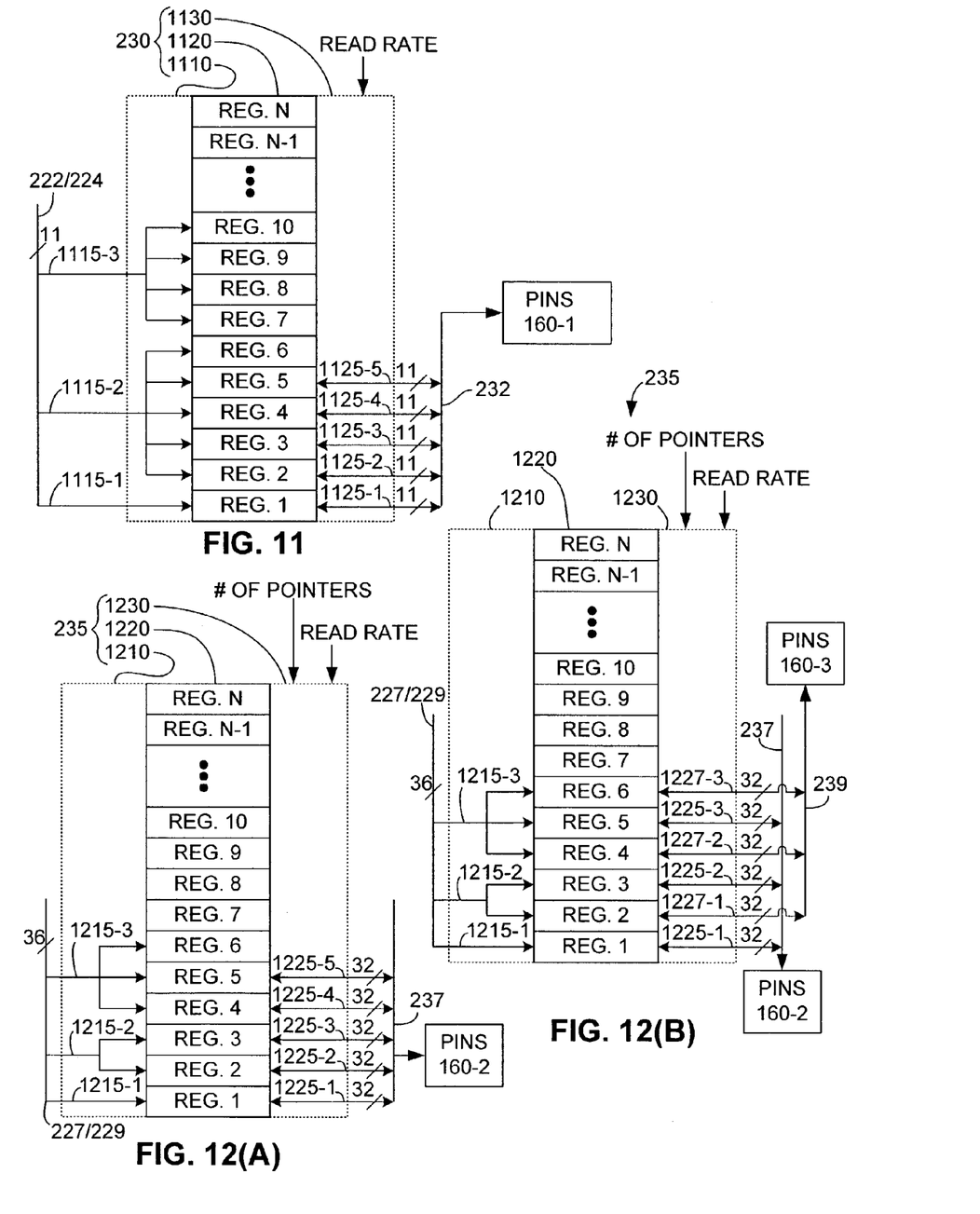
FIG. 11 is a simplified diagram showing a program output buffer utilized by the trace port circuit of FIG. 2.
FIGS. 12(A) and 12(B) are simplified diagrams showing a data output buffer utilized by the trace port circuit of FIG. 2.

FIG. 11 is a simplified diagram showing program FIFO 230 in additional detail. Program FIFO 230 includes a write pointer stage 1110, a register stack 1120, and a read pointer/driver circuit 1130.

Referring to the left side of FIG. 11, write pointer circuit 1110 sequentially writes program trace information from busses 222 and 224 into registers REG. 1 through REG. N of register stack 1120 at the processor core frequency. For example, when a program trace burst 1115-1 from program compression circuit 220 includes a single byte (plus associated identification code), as indicated in FIG. 10(A), then this program trace information is stored by write pointer stage 1110 into a next-available register (e.g., REG. 1). As indicated above burst 1115-1, a subsequently received program trace burst 1115-2 from program compression circuit 220 includes five bytes (plus associated identification codes), similar to the burst depicted in FIG. 10(B), which are received during one clock cycle of the core frequency. The five bytes/codes are written successively by write pointer stage 1110 into registers REG. 2 through REG. 6, as indicated in FIG. 11. Subsequent transmissions, as indicated by burst 1115-3, are sequentially written into registers REG. 1 through REG. N, at which time the write pointer points again to register REG. 1.

Referring to the right side of FIG. 11, read pointer/driver circuit 1130 sequentially reads program trace information from registers REG. 1 through REG. N in a manner similar to that employed by conventional FIFO circuits, but differs from conventional FIFO circuits in two ways. First, unlike conventional FIFOs that passively transmit program trace information read from register stack 1120, read pointer/driver circuit 1130 includes master interface logic that actively drives the read program trace information onto associated device pins 160-1 using, for example, buffers or inverter devices. Second, unlike conventional FIFOs that read the data at a fixed rate, the master interface logic is controlled by a "read rate" output control signal to alternatively output the program trace information at a selected output frequency (e.g., f/2 or f/4, as discussed above), thereby allowing a user to match the output frequency to a particular debug system (not shown) that is coupled to pins 160-1.

FIGS. 12(A) and 12(B) are simplified diagrams showing data FIFO circuit 235 in additional detail. Similar to program FIFO 230, data FIFO 235 includes a write pointer stage 1210, a register stack 1220, and a read pointer/driver circuit 1230. Write pointer circuit 1210 operates essentially as described above with reference to write pointer circuit 1110 in that it sequentially writes data trace information from busses 227 and 229 into registers REG. 1 through REG. N of register stack 1220 at the processor core frequency. For example, single word burst 1215-1 is written into REG. 1 during a first clock cycle, double word burst 1215-2 is written into REG. 2 and REG. 3 during a second clock cycle, and triple word burst 1215-3 is written into REG. 4 through REG. 6 during a third clock cycle. In addition, similar to read pointer/driver circuit 1130, read pointer/driver circuit 1230 sequentially reads program trace information from registers REG. 1 through REG. N in the manner described above with reference to read pointer/driver circuit 1130, and drives the data trace information onto a corresponding set of device pins. In addition, according to another aspect of the present invention, read pointer/driver circuit 1230 is controlled by a "# OF POINTERS" control signal to transmit the data trace information using either one output bus or two output busses. For example, as indicated in FIG. 12(A), when set in a first control state, read pointer/driver circuit 1230 sequentially reads data trace information from registers REG. 1 through REG. N (as indicated by pointers 1225-1 through 1225-5), and drives these data trace information words to a corresponding device pin set 160-2 using only output bus 237. Conversely, as indicated in FIG. 12(B), when set in a second control state, read pointer/driver circuit 1230 reads two data trace words (i.e., from two registers) each output clock cycle, and drives the two data trace words to output pin sets 160-2 and 160-3, respectively, using output busses 237 and 238, respectively. For example, during a first clock cycle, a first data trace word 1225-1 is read from register REG. 1 and transmitted on bus 237 to pins 160-1, and a second data trace word 1227-1 is read from register REG. 2 and transmitted on bus 238 to pins 160-2. During a next output clock cycle, a data trace word 1225-2 is read from register REG. 3 and transmitted on bus 237 to pins 160-1, and a data trace word 1227-2 is read from register REG. 4 and transmitted on bus 238 to pins 160-2. Accordingly, data FIFO circuit 235 allows a user to selectively satisfy either Class 3 or Class 4 Nexus 5001 Forum requirements, and/or further allows the user to take advantage of available device pins to maximize the transmission of trace data to a debug device.

As mentioned above, according to yet another aspect of the present invention mentioned above, a "lost trace" code is transmitted from program FIFO circuit 230 and/or data FIFO circuit 235 whenever a FIFO over-run occurs. Although the configurable filtering, compression, and output buffering associated with configurable trace port 150 alleviate such over-run problems, certain "dense" bursts of trace information (e.g., several taken indirect loops in a short sequence of code execution) may cause either or both FIFOs to over-run. According to this last aspect, when an over-run is detected, instead of stalling the processor, a "mark" (i.e., the trace error code mentioned above) is inserted into the associated FIFO and the remaining registers are cleared. Subsequent program/data trace information is then written/read as described above. Accordingly, although over-runs can occur, the resulting trace information indicates the location of the error, and provides usable trace information before and after the over-run. Further, by modifying the trace operation utilizing configurable filter circuit 152 to block data/program information immediately preceding the over-run, a user is potentially able to capture the "lost" trace information, which can then be concatenated with the previously obtained information to provide a complete trace picture.

Although the present invention has been described with respect to certain specific embodiments, it will be clear to those skilled in the art that the inventive features of the present invention are applicable to other embodiments as well, all of which are intended to fall within the scope of the present invention. For example, portions of OCDS circuit 140 can be omitted or modified to reduce or provide additional trigger signals. Function generators other than SOP circuits and state machines other than those described herein may also be utilized. In yet other alternative embodiments, programmable trigger circuit 410 may omit programmable state machine 640, and only provide the combinational trigger signals from function generators 630-1 through 630-4. Alternatively, programmable trigger circuit 410 may omit function generators 630-1 through 630-4, and only provide a state machine driven by pre-trigger signals (which is functionally implemented in the disclosed embodiment by programming function generators 630-1 through 630-4 to "pass through" a corresponding pre-trigger signal). Further, output buffers other than FIFO circuits may be utilized to control the transmission of data trace and program trace information to an external debug system.

The invention claimed is:

1. An embedded processor comprising:
    a processor core for executing a program instruction associated with an instruction word transmitted on an instruction bus, and for transmitting a corresponding data word on a data bus in response to the executed program instruction; and
    a trace port circuit including:
        a configurable filter circuit coupled to the instruction bus and the data bus for selectively passing at least a portion of the instruction word and the corresponding data word when at least one of the instruction word and the corresponding data word satisfies a user-defined trigger event;
        a compression circuit for compressing said at least one of the instruction word and the corresponding data word passed from the configurable filter circuit; and
        an output buffer for temporarily storing the compressed instruction word and compressed data word,
    wherein the configurable filter circuit includes a first trace filter including a switch having input terminals connected to the instruction bus and the data bus,
    wherein the embedded processor further comprises a on-chip debug support (OCDS) circuit coupled to the instruction bus and the data bus, the OCDS circuit including storage that stores instruction information and data information, and a generator that generates a switch control signal that causes the first switch to pass said portion of the instruction word and the corresponding data word when at least one of the instruction word and the corresponding data word matches the stored instruction information and data information, and wherein the OCDS circuit comprises:
programmable trigger generator including:
a plurality of trigger event detection registers, each said register including a memory circuit for storing at least one trigger value, and an assertor that asserts a pre-trigger signal only when the stored trigger value matches a corresponding value transmitted on at least one of the data address bus, the data value bus, and the instruction bus, and
a programmable trigger logic circuit including a function generator for generating an intermediate trigger signal in response to a user-defined combination of the pre-trigger signals generated by the plurality of trigger event detection registers; and
an action generator circuit for asserting a BWP trigger in response to the intermediate trigger signal.

2. The embedded processor according to claim 1, wherein the plurality of trigger event detection registers include an instruction register for storing a first instruction address and a second instruction address, and wherein the instruction register includes an assertor that asserts a first pre-trigger signal when a third instruction address transmitted on the instruction address bus is within a range defined by the first and second instruction addresses.

3. The embedded processor according to claim 1, wherein the plurality of trigger event detection registers include a data register for storing a first data address, a second data address, and wherein the data register includes an assertor that asserts a second pre-trigger signal when a third data address transmitted on the data address bus is within a range defined by the first and second data addresses.

4. The embedded processor according to claim 3, wherein the data register further comprises a first data value and a mask value for masking a portion of the first data value, and wherein the data register includes an assertor that asserts the second pre-trigger signal when a second data value transmitted on the data value bus matches an unmasked portion of the first data value.

5. The embedded processor according to claim 1, wherein the function generator comprises a sum-of-products circuit for generating a combinational trigger signal that represents a user-defined function of the plurality of pre-trigger signals generated by the plurality of trigger event detection registers.

6. The embedded processor according to claim 5, wherein the sum-of-products circuit comprises sixteen registers and a multiplexing structure that is controlled by four pre-trigger signals to pass a data value from one of the sixteen registers to an output terminal of the multiplexing structure.

7. The embedded processor according to claim 1 wherein the programmable trigger logic circuit comprises first, second, third, and fourth function generators, each of the first, second, third, and fourth function generators including a generator that generates an associated intermediate trigger signal in response to a user-defined combination of the pre-trigger signals.

8. The embedded processor according to claim 7, wherein the programmable trigger logic circuit further comprises a programmable state machine coupled to receive the associated intermediate trigger signals generated by the first, second, third, and fourth function generators, wherein the programmable state machine includes a generator that generates a state trigger signal when said associated intermediate trigger signals are asserted in a predefined sequence.

9. The embedded processor according to claim 8, wherein the programmable state machine comprises a four-state finite state machine that includes a passer that passes control from a first state to a second state when a stored value associated with the first state matches an asserted one of said intermediate trigger signals.

10. The embedded processor according to claim 1, wherein the compression circuit comprises:
a converter that converts the instruction word into at least one program trace bytes according to a predetermined compression scheme, and for transmitting the at least one program trace bytes to the output buffer; and
a generator that generates a plurality of identification codes, each identification code being transmitted with a corresponding program trace byte.

11. The embedded processor according to claim 10, wherein the output buffer comprises a first First-In-First-Out (FIFO) circuit including:
a plurality of sequentially arranged registers;
a write pointer circuit for sequentially writing the at least one program trace bytes into the sequentially arranged registers at a processor core frequency; and
a read pointer/driver circuit for sequentially reading program trace bytes from the sequentially arranged registers at a user-defined frequency, and for driving the read program trace bytes onto a first set of device pins.

12. The embedded processor according to claim 11, further comprising an adjustor that adjusts the user-defined frequency between f/2 and f/4, where f is the processor core frequency.

13. The embedded processor according to claim 11, further comprising a detector that detects an over-run condition of the first FIFO circuit, for erasing program trace bytes from the plurality of sequentially arranged registers, and for writing an error code into a selected register of the plurality of sequentially arranged registers.

14. The embedded processor according to claim 1,
wherein each data word includes a data address transmitted on a first portion of the data bus, and a data value transmitted on a second portion of the data bus, and
wherein the compression circuit comprises:
a converter that converts the data value and the data address into at least one data trace words according to a predetermined compression scheme, and for transmitting the at least one data trace words to the output buffer; and
a generator that generates at least one identification codes, each identification code being transmitted with a corresponding data trace word.

15. The embedded processor according to claim 14, wherein the output buffer comprises a second First-In-First-Out (FIFO) circuit including:
a plurality of sequentially arranged registers;
a write pointer circuit for sequentially writing the at least one data trace words into the sequentially arranged registers at a processor core frequency; and
a read pointer/driver circuit for sequentially reading data trace words from the sequentially arranged registers at a user-defined frequency, and for driving the read program trace bytes onto a second set of device pins.

16. The embedded processor according to claim 15, further comprising an adjustor that adjusts the user-defined frequency between f/2 and f/4, where f is the processor core frequency.

17. The embedded processor according to claim 15, further comprising a detector that detects an over-run condition of the second FIFO circuit, for erasing program trace bytes from the plurality of sequentially arranged registers, and for writing an error code into a selected register of the plurality of sequentially arranged registers.

18. An embedded processor comprising:
a processor core for executing a program instruction associated with an instruction word transmitted on an instruction bus, and for transmitting a corresponding data word on a data bus in response to the executed program instruction; and
a trace port circuit including:
a configurable filter circuit coupled to the instruction bus and the data bus for selectively passing at least a portion of the instruction word and the corresponding data word when at least one of the instruction word and the corresponding data word satisfies a user-defined trigger event;
a compression circuit for compressing said at least one of the instruction word and the corresponding data word passed from the configurable filter circuit; and
an output buffer for temporarily storing the compressed instruction word and compressed data word,
wherein the configurable filter circuit further includes a first trace filter having a first switch connected between a first intermediate bus and a first output bus, a second switch connected between a second intermediate bus and a second output bus, and third switch connected between a third intermediate bus and a third output bus, wherein the first, second and third intermediate busses are connected to corresponding output terminals of the first trace filter, and
wherein the first, second and third output busses are connected to the compression circuit.

19. The embedded processor according to claim 18, wherein the compression circuit comprises a program compression circuit connected to the first output bus, and a data compression circuit connected to the second and third output busses.

20. The embedded processor according to claim 19, wherein the output buffer comprises a first First-In-First-Out (FIFO) circuit coupled to the program compression circuit, and a second FIFO circuit coupled to the data compression circuit.

21. An embedded processor comprising:
a processor core for executing a program instruction associated with an instruction word transmitted on an instruction bus, and for transmitting a corresponding data word on a data bus in response to the executed program instruction; and
a trace port circuit including:
a configurable filter circuit coupled to the instruction bus and the data bus for selectively passing at least a portion of the instruction word and the corresponding data word when at least one of the instruction word and the corresponding data word satisfies a user-defined trigger event;
a compression circuit for compressing said at least one of the instruction word and the corresponding data word passed from the configurable filter circuit; and
an output buffer for temporarily storing the compressed instruction word and compressed data word,
wherein each data word includes a data address transmitted on a first portion of the data bus, and a data value transmitted on a second portion of the data bus, and
wherein the compression circuit comprises:
a converter that converts the data value and the data address into at least one data trace words according to a predetermined compression scheme, and for transmitting the at least one data trace words to the output buffer; and
a generator that generates at least one identification codes, each identification code being transmitted with a corresponding data trace word,
wherein the output buffer comprises a second First-In-First-Out (FIFO) circuit including:
a plurality of sequentially arranged registers;
a write pointer circuit for sequentially writing the at least one data trace words into the sequentially arranged registers at a processor core frequency; and
a read pointer/driver circuit for sequentially reading data trace words from the sequentially arranged registers at a user-defined frequency, and for driving the read program trace bytes onto a second set of device pins, and
wherein the read pointer circuit further comprises an adjuster that adjusts between a first control state in which one data trace word is read and driven onto the second set of device pins during each clock cycle of the user-defined frequency, and a second control state in which a first data trace word is read from a first register and driven onto the second set of device pins, and a second data trace word is read from a second register and driven onto the third set of device pins during each clock cycle of the user-defined frequency.

* * * * *

UNITED STATES PATENT AND TRADEMARK OFFICE
CERTIFICATE OF CORRECTION

PATENT NO. : 7,149,926 B2
APPLICATION NO. : 10/444918
DATED : December 12, 2006
INVENTOR(S) : Sagheer Ahmad et al.

It is certified that error appears in the above-identified patent and that said Letters Patent is hereby corrected as shown below:

Column 3, line 19, "sequences" should read --sequence--

Column 4, line 11, "utilizing" should read --utilized--

Column 4, line 43, "is a block diagram is a simplified diagram" should read --is a simplified block diagram--

Column 12, line 52, "store" should read --stored--

Signed and Sealed this

Sixth Day of February, 2007

JON W. DUDAS
*Director of the United States Patent and Trademark Office*